March 1, 1949. A. G. RICHARDSON ET AL 2,462,898
DIRECTION FINDING SYSTEM
Original Filed Feb. 6, 1943
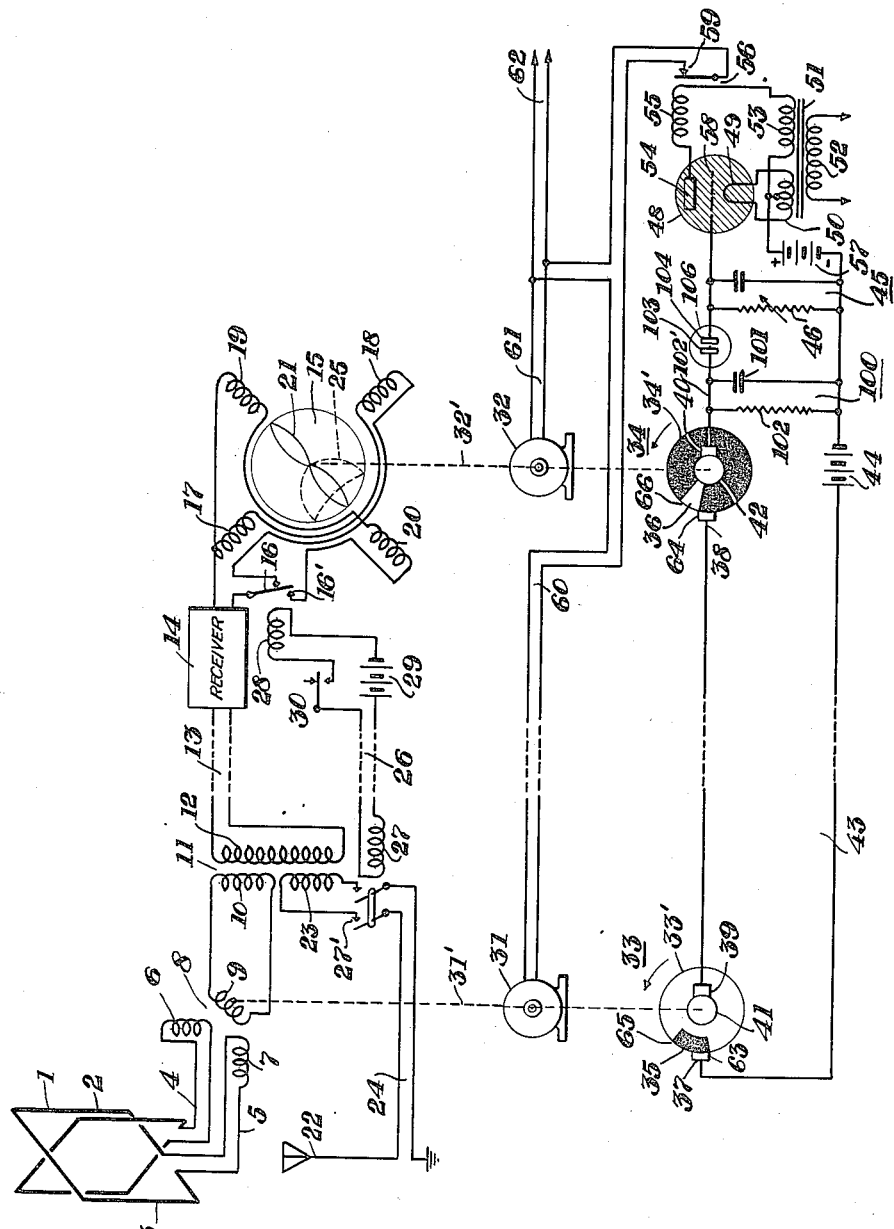
INVENTORS
AVERY G. RICHARDSON
FRANK O. CHESUS
BY
*Percy L. Lantzy*
ATTORNEY Patented Mar. 1, 1949

2,462,898

UNITED STATES PATENT OFFICE 2,462,898

DIRECTION FINDING SYSTEM

Avery G. Richardson, Boonton, N. J., and Frank O. Chesus, Jackson Heights, N. Y., assignors to Federal Telephone and Radio Corporation, New York, N. Y., a corporation of Delaware Original application February 6, 1943, Serial No. 474,984. Divided and this application August 29, 1945, Serial No. 613,328

6 Claims. (Cl. 343—118)

This invention relates to rotary position or direction finders, and in particular to visual radio direction finding systems in which it is necessary to maintain a goniometer rotor coil and the rotating deflection coils of a remote indicator in a fixed relative position in order that a true indication of the bearing will at all times be obtained.

This is a division of our patent for "Rotary position corrector," 2,406,853, dated Sept. 3, 1946.

In order to obtain a fixed pattern or trace on the fluorescent screen of the indicator, of a direction finding system it is necessary that the deflection coils be rotated at the same angular velocity that is given the rotor coil of the goniometer. Furthermore, in order that the pattern will indicate the true bearing of the incoming signal wave with respect to a fixed scale on the indicator, it is necessary that a predetermined and fixed phase relation exist between the rotor coil of the goniometer and the deflection coils of the indicator.

It is an object of our invention to provide a method and means for producing a pattern on the fluorescent screen of an indicator which will give the true bearing of a signal received by a directive antenna and goniometer arrangement located remotely to the indicator.

Another object of the invention is to maintain the goniometer rotor coil and the rotary sweep component of the indicator at a given angular relation with respect to each other.

Other features and objects of our invention will become apparent as we proceed with the specification and a description of the drawings in which the sole figure is a schematic diagram, showing a preferred embodiment of our invention in which the control apparatus for determining the angular relation between the goniometer and the indicator comprises rotating contactors directly associated with the rotating parts of the goniometer and the indicator.

In systems of the character disclosed in our invention, a directive antenna and a sensing antenna may be installed at a remote point. The directive antenna may be of the well-known Adcock type, or of the equally well-known crossed loop type. The voltages from the directive antenna may be fed to the stator coils of a goniometer unit through suitable transmisison lines, so as to maintain a quadrature phase relation in the stator coils. The stator coils are mounted at right angles to each other, thereby producing a rotating magnetic field, which varies in strength in accordance with the direction of the received signal. A voltage is induced in the rotor coil of the goniometer in accordance with the strength of this received signal. This voltage is utilized to operate a receiver, which may be located at a remote point. The receiver amplifies and detects the signal and energizes the rotating deflecting coils of an oscillograph or indicator, preferably of the cathode ray type.

The electron beam of the indicator is deflected in accordance with the strength of the current flowing in the deflection coils. The pattern on the indicator screen indicates the direction line of the received signal, but not the true bearing or sense of the signal. The signal bearing is obtained by adding to the voltage obtained from the directive antenna, a second voltage obtained from a sense antenna, the latter being symmetrically arranged with respect to the directional antenna. The voltage from the sense antenna must also be applied to the receiver in suitable phase relation in order to form a trace on the oscillograph which indicates the true bearing of the received signal. The manner of applying the directional voltages and the sense voltage to the goniometer and associated equipment is completely described in a copending application H. G. Busignies, Serial No. 468,668, filed December 11, 1942, and assigned to the same assignee.

Referring now to the figure of the drawing, the reference numeral 1 indicates the directive antenna system. It is illustrated as composed of two loops 2 and 3 located at right angles to each other. Other forms of directive antennas such as the Adcock type could be employed. From these loops, transmission lines 4 and 5 lead to the stator coils 6 and 7, respectively, of a goniometer unit 8. The rotating coil 9 of the goniometer is connected to the primary 10 of a transformer 11. The output from the secondary 12 of this transformer is fed through a transmission line 13 to the input of a receiver 14. The receiver amplifies and detects the signal and energizes one of two pairs of rotating deflection coils of the indicator 15, depending upon the position of the armature 16 of the relay 16'.

In the position shown in the drawing, that is, with armature in its back position, the energy is fed to deflection coils 17 and 18. With the armature in its front position, deflection coils 19 and 20 are energized. The circuits of the receiver 14 are so organized that an increased input voltage thereto results in a reduction of current in the output circuit. Therefore, when no energy is being received, the direct current flowing through the deflection coils 17 and 18 produces a circular trace on the indicator screen. The centering of this trace, its diameter, the brightness of the trace, etc., are adjusted locally by known means. When an incoming signal is being received, a reduction of the output current of the receiver takes place, and the deflection coils, being de-energized either totally or in part, cause certain portions of the circle trace to recede toward the center of the indicator with the result that a modified trace is produced having an outline somewhat as shown at 21 in the figure. The position of the coils 17 and 18 is so adjusted, with respect to a suitable scale (not shown) associated with the indicator, that the elongated trace points in the direction of the received signal.

In order to determine the sense of the bearing, the sense antenna 22 is connected to a second primary 23 of the transformer 11 through the transmission line 24. The phase relations between the signals from the directive antenna and from the sense antenna are such that the trace on the fluorescent screen of the indicator points in a direction of 90° to the true direction of the signal. To overcome this condition, and have the indicator trace point in the true direction of the signal, the output from the receiver is connected to the second set of deflection coils 19 and 20, disposed at right angles to the coils 17 and 18. When adjustments are made to obtain proper signal strengths, etc., the pattern takes the approximate form shown in the dotted trace 25.

The sense antenna is connected to the receiver through the transformer 11 by closing the contacts 27'. This closure is effected by completing the series circuit 26, consisting of relay coil 27, relay coil 28, an energy source shown as a battery 29, and the operating key 30.

In order to maintain a constant angular velocity of the rotor coil 9 and the deflector coils 17, 18, 19 and 20, and at the same time also maintain a fixed angular relation therebetween, we employ two synchronous motors 31 and 32 for driving the rotor coil and the deflector coils, respectively. The dotted lines 31' and 32' indicate the mechanical connections between the motors and the coils. These synchronous motors are of the salient pole type, and in this particular adaptation of our invention, we prefer to use motors having four poles each, thereby giving a rotation of thirty cycles per second when connected to a standard sixty cycle source. This is not to be construed as a limitation to our invention, since motors having a greater or lesser number of poles may be employed.

Also connected to the synchronous motors 31 and 32 are two rotary contactors or controllers 33 and 34, respectively. These controllers are preferably directly connected to the shafts of the synchronous motors, but if desirable, they could be otherwise connected, such as for example, through suitable gearing. Contactor 33 comprises a conducting disc 33' having one insulating segment 35 in its periphery, while contactor 34 consists of an insulating disc 34' having a conducting segment 36. The width of the segments 35 and 36 is preferably made about 10° or about one thirty-sixth of the total circumference of the discs. Brushes 37 and 38, which bear on the peripheries of the discs 33' and 34', must be of such a width and so placed relative to the contactor discs that when the apparatus is functioning properly, the duration of the break contactor 33 must be substantially equal to the duration of the make contact of contactor 34, and furthermore, the instant of break on one contactor should coincide with the instant of make on the other contactor and vice versa. The reason for this will be brought out presently.

Another pair of brushes 39 and 40 make contact with slip rings 41 and 42 of the rotary contacts 33 and 34, respectively, these slip rings being connected with the conducting segments of both contactor discs.

A series circuit 43 comprising the contactor 33, the contactor 34, a potential source shown as a battery 44, and a time delay circuit or network 100 consisting of a capacitor 101 and a resistor 102 connected in parallel is employed to energize an energy translator, shown as a grid controlled gaseous discharge tube 48, at those times when the rotors of the motors do not have the desired angular phase relation. The discharge tube may be of the type frequently identified in the art as a "Thyratron." The filament 49 of the "Thyratron" is energized from the secondary winding 50 of the transformer 51, the primary 52 of this transformer being connected to a suitable power source. The secondary winding 53 supplies potential to the anode 54 of the "Thyratron" through the winding 55 of the relay 56. A potential source 57 connected in series with the resistor 46 in the delay circuit 45 is employed for biasing the grid 58 of the "Thyratron" to cut-off, thereby preventing a flow of current in the plate circuit of the "Thyratron" during normal operating conditions, and thus permitting the contact 59 to remain in the closed position as shown. In this position, both synchronous motors 31 and 32 are supplied with sixty cycle current through the leads 60 and 61 from a suitable source 62.

Between the time delay circuit or network 100 and the delay circuit 45 is an ionization or gaseous discharge tube 106 of the diode type, having two electrodes 103 and 104. The function of this ionization tube will be described shortly.

With the contactor brushes in the position shown on the drawing and rotation in the direction of the arrows, it is assumed that the brush 37 is just breaking at the point 63, while the brush 38 is just making at the point 64. Approximately a thirty-sixth of a rotation later, the brush 37 will make at the point 65, while the brush 86 will be breaking at the point 66. Under these conditions, it will be seen that at no time is the circuit 43 energized from the battery 44. With the commutating devices operating as just described, it is assumed that the relative positions of the rotor coil 9 and the deflector coils of the indicator are in their proper relative position to produce the desired indication or trace on the screen of the indicator.

However, if this latter condition is not true, it means that the contactor brushes with respect to their cooperating make and break positions are such that the series circuit 43 is completed, and that a positive pulse appears at the point 102 of the network 100. During successive revolutions of the contactors 33 and 34, the potential of the electrode 103 increases until a value is reached sufficient to break down the gaseous path between the electrodes 103 and 104 of the discharge tube 106. When this occurs, current momentarily flows in the series circuit formed by the gas discharge tube 106, the delay circuit 45 and the network 100, thereby transferring this positive potential to the grid 58 of the "Thyratron" 48. The magnitude of this positive pulse is sufficient to overcome the negative biasing potential of the battery 57 thus causing the plate filament circuit of the "Thyratron" to break down and allow current to pass through the relay coil 55. The energizing of this coil opens the contact 59 and causes one of the motors 31 to be deenergized. The contact 59 remains open long enough for the armature of the motor 31 to slow down one-quarter of a revolution, or the angular distance between two of its salient poles. In so doing, the relative position of the brush 63 is changed one-quarter of a revolution with respect to the insulating segment 35. This also causes the rotor 9 to fall back one-quarter revolution.

The time interval during which the contact 59 remains open is controlled by the constants of the network 100 and the delay circuit 45 in the following manner:

As soon as the discharge tube 106 breaks down and transfers voltage from the electrode 103 to the electrode 104 (or the grid 58), the insulating property of the space between these electrodes is immediately restored, and this results in the isolation of the network 100 and the circuit 45. During this period of isolution the positive charge on the grid 58 leaks off through the resistor 46, until the grid potential is no longer sufficient to keep the plate current flowing. The resistor 46 may be made variable, thus permitting control of the time during which the plate current flows. During this same time, the circuit 43 is again building up a charge on the electrode 103 of the tube 106 and the sequence of operation continues, in the event that the rotor of motor 31 has not attained its desired position. If the rotor has obtained the desired position, the contactor segments and brushes of the contactors 33 and 34 are in such position that no voltage can be established on the electrode 103, the two motor rotors are in proper angular relationship, and the contact 59 remains closed For modifications of the contactor or controller arrangement shown in the drawing, reference may be had to our aforesaid Patent #2,406,853.

While we have shown and described a particular embodiment of our invention, it will be understood that such is given by way of example only, and not as limiting the scope of the invention as set forth in the objects and the appended claims.

We claim:

1. In a direction finding system having means for producing a magnetic field with the maximum intensity thereof in a direction corresponding to the direction of a received signal and a cathode ray indicator for producing a trace indication on the screen thereof; means for producing a rotation of said trace comprising a first synchronous motor, means for rotating a winding in said magnetic field to obtain an electrical energy output in accordance with the intensity characteristics of said field comprising a second synchronous motor, means for deflecting the electron beam of said indicator according to the instantaneous values of said energy, whereby said trace is altered for signal direction indication, means to synchronize the rotation of said winding with the rotation of said trace, comprising a power supply for normally energizing both of said motors, an impulse generating device operated by one of said motors, an impulse blocking device operated by the other of said motor, both of said devices having active periods of substantially equal duration, a circuit comprising said generating device, said blocking device and a translator said generating device controlling said translator, and means controlled by said translator for deenergizing one of said motors when the active periods of said generating and blocking devices do not coincide in time.

2. In a direction finding system having means for producing a magnetic field with the maximum intensity thereof in a direction corresponding to the direction of a received signal and a cathode ray indicator having rotatable deflection windings for producing rotary deflection of the electron beam thereof; means for rotating a winding in said magnetic field to obtain an electrical energy output in accordance with the intensity characteristics of said field comprising a first synchronous motor, means to rotate said deflection windings comprising a second sychronous motor, means for applying said energy to said deflection windings whereby the beam trace is altered for signal direction indication, means to synchronize the rotation of said winding with the rotation of said deflection windings, comprising a power supply for normally energizing both of said motors, a translator controlling the deenergization of one of said motors, a control circuit therefor, a controller in said control circuit permitting opening and closing the same, said controller being operated by one of said motors, and means for applying a voltage to said translator through said controller, said means being in said control circuit and operated by the other of said motors.

3. An arrangement as set forth in claim 1, wherein said translator comprises a grid controlled gas discharge tube having an input ionization tube, and a second time delay circuit, said first delay circuit controlling said discharge tube and said second delay circuit controlling said ionization tube.

4. An arrangement as set forth in claim 1, wherein said blocking device having an active period comprises a two-winding transformer having a gap in the permeable core thereof, and means for increasing the reluctance of said core during said active period.

5. An arrangement as set forth in claim 1, wherein additional means are provided for electrically isolating said translator from said blocking device for a predetermined number of pulses of said pulse generating device.

6. An arrangement as set forth in claim 2, wherein said translator comprises a grid controlled gas discharge tube and a relay.

AVERY G. RICHARDSON.
FRANK O. CHESUS.

REFERENCES CITED

The following references are of record in the file of this patent:

UNITED STATES PATENTS

| Number | Name | Date |
|---|---|---|
| 1,963,087 | Hay | June 19, 1934 |
| 2,130,912 | Tolson | Sept. 20, 1938 |